United States Patent [19]

Staples et al.

[11] Patent Number: 5,186,686
[45] Date of Patent: Feb. 16, 1993

[54] LINK AND BEARING FOR ROTARY COUPLING

[75] Inventors: Frank E. Staples; Donald D. Russell, both of Fairview; James L. Potter, Edinboro, all of Pa.

[73] Assignee: Lord Corporation, Erie, Pa.

[21] Appl. No.: 522,288

[22] Filed: May 11, 1990

[51] Int. Cl.⁵ .............................................. F16D 3/62
[52] U.S. Cl. ........................................ 464/69; 464/70; 464/904
[58] Field of Search ............... 464/69, 81, 85, 70, 464/71, 94, 96, 106, 138, 147, 904; 384/220, 221

[56] References Cited

U.S. PATENT DOCUMENTS

| 4,575,358 | 3/1986 | Ferris ........................... 464/904 X |
| 4,729,753 | 3/1988 | Neathery et al. ............... 464/71 |
| 4,734,081 | 3/1988 | Neathery et al. ............... 464/71 |
| 4,804,352 | 2/1989 | Schmidt ........................ 464/81 X |

FOREIGN PATENT DOCUMENTS

466646 6/1937 United Kingdom ............... 384/220

Primary Examiner—Daniel P. Stodola
Assistant Examiner—Tony A. Gayoso
Attorney, Agent, or Firm—Howson & Howson

[57] ABSTRACT

A link for use in a link-type rotary coupling. The link has an elastomeric bearing which incorporates a pair of cavities that provide discontinuities for preventing the transfer of tensile stresses in the elastomeric layers when the link is tensioned axially while permitting the elastomeric layers to accept compressive stresses when the link is compressed axially. The resulting link is durable.

25 Claims, 3 Drawing Sheets

LINK AND BEARING FOR ROTARY COUPLING

FIELD OF THE INVENTION

The present invention relates to links particularly suited for use in heavy-duty link type couplings wherein torque is transferred between drive and driven members rotatable about misaligned axes.

BACKGROUND OF THE INVENTION

There has been a continuous need for a constant-velocity coupling capable of transferring substantial amounts of torque between drive and driven members which rotate about misaligned axes. A particularly demanding application for such a coupling is described in U.S. Pat. No. 4,804,352, to Schmidt, owned by the assignee of the present application. The application involves the transfer of over 4,000 horsepower between shafts which may rotate at up to a 10° misalignment angle in a so-called tilt rotor aircraft, i.e. an aircraft which is designed either to fly, or hover, in a helicopter-like mode or to fly in an airplane mode. While the links in the patented coupling are designed to operate in a non-couplings designed to transmit torque between shafts rotatable around misaligned axis. The link incorporates an elastomeric bearing assembly of a particular configuration which resists propagation of undesirable tensile stresses in the elastic layers when the link is tensioned to transfer torque from the drive member to the driven member while being capable of reacting transient reverse torque conditions that may occur.

A preferred link includes an elongate link body having apertures at opposite ends within which are provided inner bushing members adapted to be connected to the drive and driven members. Between each inner bushing member and link body there is provided a series of alternating layers of elastomeric material and relatively inelastic shims. In a major arcuate zone adjacent the terminal end of the link body, the elastomeric layers are bonded to the link body and to the inner member. A minor arcuate zone of like alternating layer is provided diametrically opposite the first mentioned zone and is separated therefrom by discontinuities in the elastomeric layers, preferably provided by cavities extending transversely between the inner bushing member and the like body in conjunction with splits in the inelastic shims. In this minor zone, an elastomer layer is intentionally left unbonded from a shim, from the outer surface of the inner mounting bushing, or from the inner concave surface of the link body so that slip joint is provided which extends between the discontinuities. A slight separation exists along the slip joint when the link body is tensioned to transfer torque in one direction but is engaged when the link is compressed to react reverse torque conditions. Preferably, the arcuate extent between the discontinuities in the minor bearing suction is less than about 180° relative to the pivot axis of the inner bushing member. Among other advantages, this construction reduces the stiffness of the inner member to pivotal and cocking motion relative to the link body, and it reduces substantially tensile stresses among the elastomeric layers when the link is tensioned during transfer of torque in the normal operating direction. The reduction in tensile stresses in the elastomeric layers reduces the proclivities for cracking and, therefore, enhances the service life of the link assembly.

BRIEF DESCRIPTION OF THE DRAWINGS

The forgoing and other objects, features and advantages of the present invention should become apparent from the following description when taken in conjunction with the accompanying drawings, in which.

DESCRIPTION OF THE PREFERRED EMBODIMENT

As discussed heretofore, the present invention provides an improvement on the invention disclosed in U.S. Pat. No. 4,804,352 issued to Schmidt and owned by the assignee of the present application. The Schmidt patent includes a discussion of an aircraft power transmission application which presents a particularly severe operating environment for a link type rotary coupling. Links of the present invention are particularly suited for use in the application described in the Schmidt patent.

Before discussing in detail the present invention, a brief review of the theoretical underopenings of the subject matter of the aforementioned Schmidt patent, is believed to be in order. Referring specifically to the Schmidt patent, the disclosure of which is incorporated by reference herein, beginning at column 5, line 24 and continuing to column 7, line 22, and with particular reference to FIGS. 3 and 4 thereof, the environment in which links of the present invention of and utility will now be described.

Figure 1:
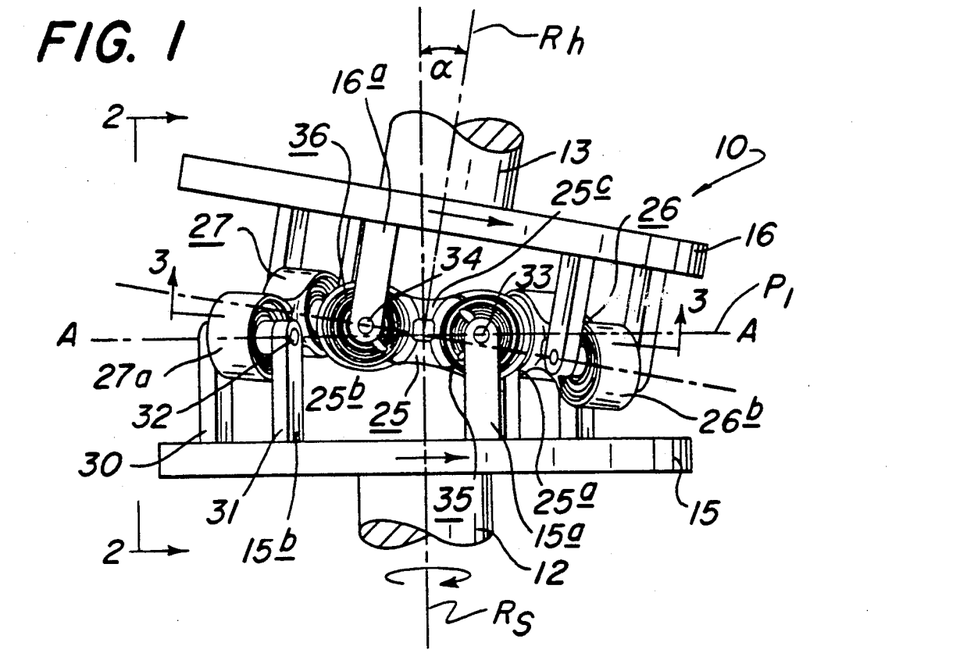
FIG. 1 is a side elevational view of a link-type rotary coupling in which is mounted a series of links embodying the present invention.

Referring now to FIG. 1, which is a simplified view of a link-type coupling, the coupling 10 is shown connecting a drive shaft 12 rotatable about a vertical axis $R_s$ to a driven shaft 13 rotatable about an axis $R_h$ which may be coaxial with the axis $R_s$ of the drive shaft, or may be disposed at an angle $\alpha$. A drive member, or hub 15, is secured to the input drive shaft 12 by conventional means (not shown) such as bolts, weldments, splines, keys, or the like. A hub 16 is similarly connected to the driven shaft 13. In the illustrated embodiment, the hubs 15 and 16 are flat/circular plates; however, it should be understood that he hubs 15 and 16 may include conventional spiders having arms extending radially outward from the shafts 12 and 13 in angularly offset relation in a plane orthogonal to the shaft rotational axes such as in a plane extending on the line A—A of FIG. 1 orthogonal to the drive shaft axis $R_s$.

To accommodate angular misalignment between the rotational axis $R_s$ of the drive shaft 12 and the rotational axis $R_h$ of the driven shaft 13, such as the misalignment angle $\alpha$ (FIG. 1) a plurality of connecting links are disposed between the hubs 15 and 16 and are interconnected therewith. As best seen in FIG. 1, each link, such as the link 25, has a leading end 25a and a trailing end 25b, the ends being defined with respect to the normal direction of rotation of the input shaft 12 as indicated by the arrow in FIG. 1 during transfer of torque. Transient reverse torque conditions may occur in the driven shaft 13 as it rotates in the same direction as the input shaft 12.

In the illustrated embodiment, three links are provided between the hubs 15 and 16, the trailing end 26b of a leading link 26 being illustrated to the right of the link 25 in FIG. 1, and the leading end 27a of a trailing link 27 being illustrated to the left of the link 25 in FIG. 1. While a three link coupling 10 is illustrated in FIG. 1, various other numbers of links may be utilized, depending upon design requirements, including spatial and loading requirements, and the like, but at least three links spaced apart equiangularly are required to ensure a constant velocity driving relation between the shafts 12 and 13 when misaligned.

Each link, such as the link 25, has its leading end portion 25a connected to the drive hub 15, as by a clevis 15a connected to the drive hub 15, and has its trailing end portion connected to the driven hug 16 as by a clevis 16a connected to the driven hub 16. The drive hub clevis 15a is located radially outward of the rotational axis $R_s$ of the input shaft 12, and hub 15 and extends axially with respect to the plane of the hub 10. In like manner, the clevis 16a is located radially outward with respect to the rotational axis $R_h$ of the output shaft 13 and hub 16, and it extends axially with respect to the plane of the hub 16. Thus, the clevises 15a and 16a are disposed in spaced confronting relation with respect to one another but are angularly offset in a horizontal plane passing through their paths of movement orthogonal to the rotational axis $R_s$ in FIG. 1.

Figure 2:
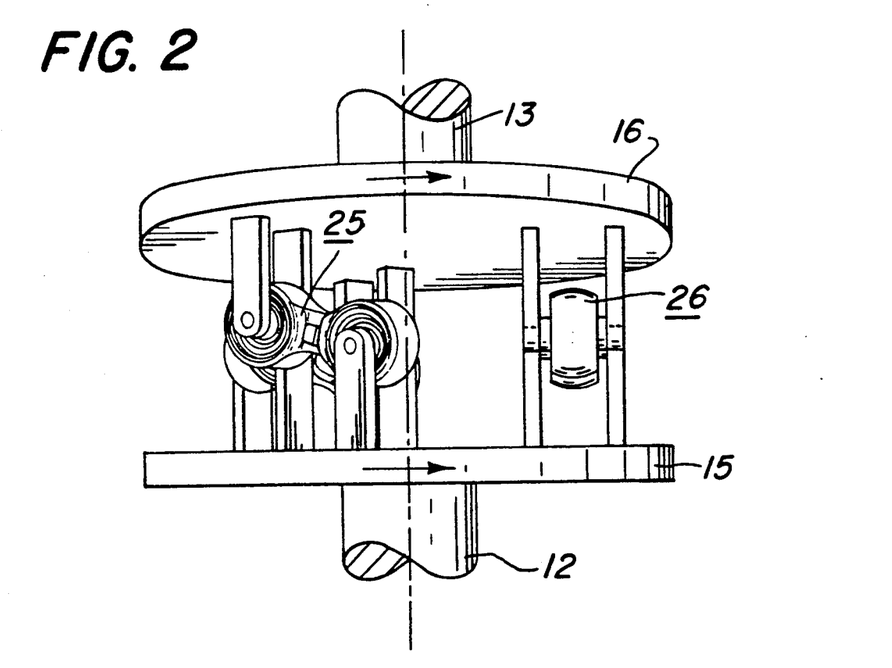
FIG. 2 is a side elevational view of the link coupling taken on line 2—2 of FIG. 1.

As best seen in FIGS. 1 and 2, each clevis, such as the clevis 15b mounting the link 27, includes a pair of upstanding trunions 30 and 31 mounted to the drive hub 15 in spaced relation for receiving the end portion of the link 27 therebetween. A connecting body and/or other attachment structure, 32 extends through the trunions 30 and 31 and transversely through the link 27. The link 25 is connected by bolts 33 and 34 to its associated clevises 15a and 16a, respectively.

With the rotational axis of the shafts 12 and 13 aligned i.e. arranged coaxially the links, such as the link 25, of the coupling 10 advance endwise in a plane $P_1$ orthogonal to the rotational axis $R_s$ to the aligned shafts 12 and 13. However, when the shaft 13 is misaligned with respect to the shaft 12, such as when it is displaced through the angle α as illustrated in FIG. 1, and the shafts 12 and 13 rotate, the links move in a complex manner when transmitting torque at a constant velocity between the input drive hub 15 and the output drive hub 16. For instance, when the shafts 12 and 13 are aligned, the link 25 advances endwise tangentially of the axis $R_s$ substantially coplanar with the plane $P_1$ orthogonal to the shaft rotational axis $R_s$. However, when the output hub 16 and its shaft 13 are offset angularly, such as illustrated in FIG. 1, the leading end portion 25a of the link 25 remains substantially in the plane $P_1$, but the trailing end portion 25b thereof is cyclically displaced axially above and below the plane $P_1$ when rotated such as illustrated in FIGS. 1 and 2. Such trailing end displacement causes a change in the distance between the bolts 33 and 34 which must be accommodated dynamically by the links in order to ensure a constant velocity connection between the hubs 15 and 16, and such change in distance occurs twice during each revolution.

In order to transmit torque while accommodating the aforementioned link motion, each link, such as the link 25, is provided with a first or leading elastomeric bearing means 35 mounted in its leading end portion 25a and a second trailing end elastomeric ring means 36 mounted in its trailing end portion 25b. See FIG. 4.

Between the elastomeric bearings 35 and 36, the link 25 has a body 25c which is axially, flexurally and torsionally stiff, but which in the illustrated embodiment, has an aperture 25' in its central portion to minimize weight. In other words, the link body 25c resists flexural and torsional defection and axial deflections caused by tensile and compressive loads. To this end, the link body 25c is preferably fabricated of strong lightweight metal, such as titanium, aluminum, or the like, but it may be of other strong lightweight materials, including composites in those applications admitting of such materials.

Figure 3:
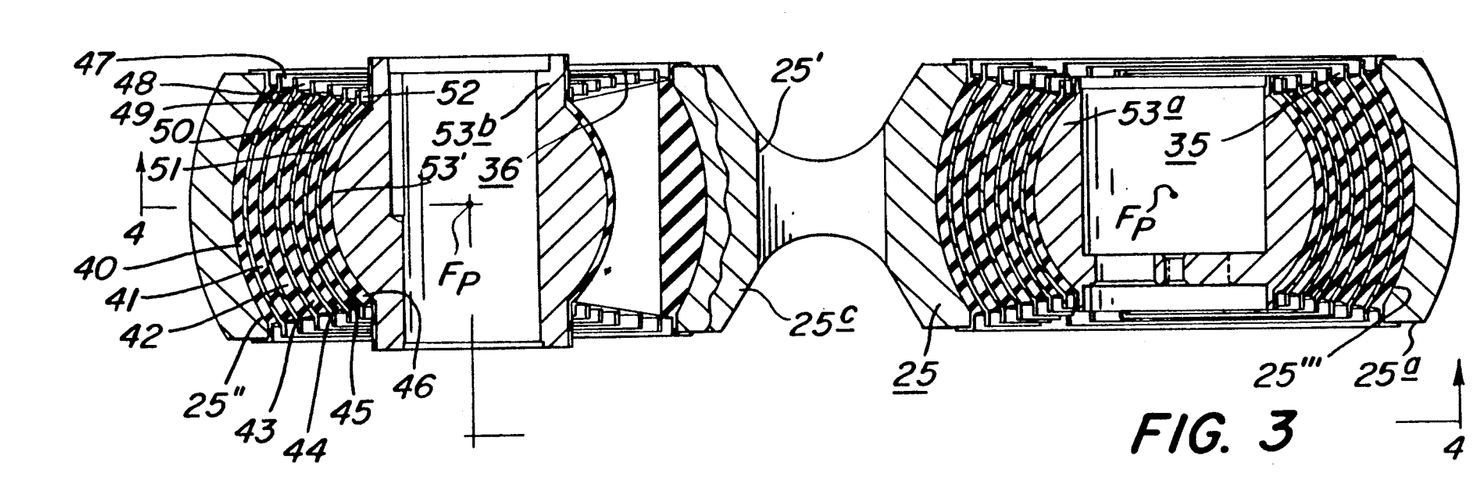
FIG. 3 is an enlarged longitudinal sectional view, taken on line 3—3 of FIG. 1.
Figure 4:
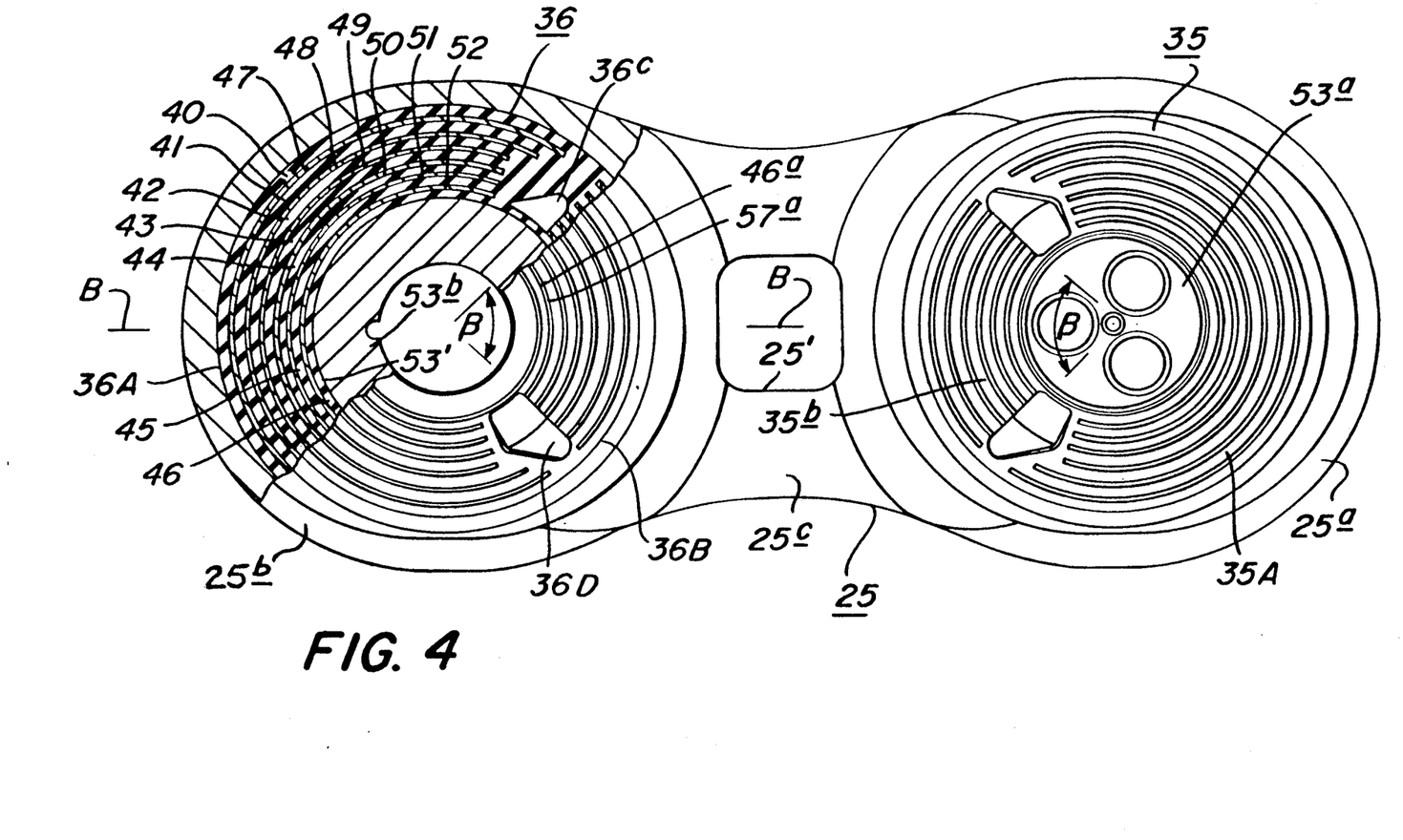
FIG. 4 is a partially broken away and sectioned view taken on line 4—4 of FIG. 3.
Figure 5:
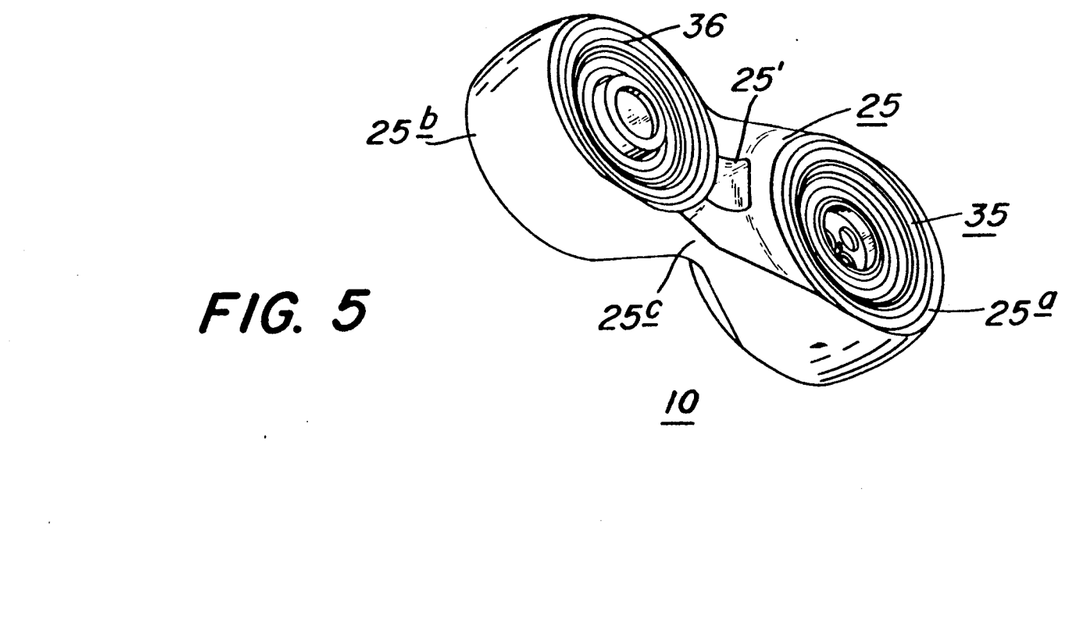
FIG. 5 is a perspective view of a link embodying the present invention.

In the preferred embodiment, as best seen in FIGS. 3-5, the trailing end elastomeric bearing means 36 comprises a laminated spherical component surrounding an inner bushing 53b. The laminated elastomeric bearing 35 at the opposite end of the link 25 is preferably of like construction surrounding an inner bushing 53a. As best seen in FIGS. 3 and 4, each elastomeric bearing includes a series of layers of elastomeric material of predetermined thickness, such as the layers 40, 41, 42, 43, 44, 45 and 46 separated by a series of concave relatively inelastic, or non-extensible, members, such as metal shims, 47, 48, 49, 50, 51 and 52 between the layers, respectively. The outermost elastomeric layer 40 is disposed adjacent to a spherical concave surface 25" formed integral within the end portion of the body 25c of the link 25. The innermost elastomeric layer 46 is disposed adjacent to a convex spherical surface 53' provided on a first attachment means, or the inner bushing member 53b, which extends transversely across the link body 25c. The leading end 25a of the link 25 has a concave surface 25''' which surrounds an inner mounting bushing 53a that is slightly different in configuration from the bushing member 53b in details not affecting the present invention. The elastomeric layers and shims 40-46 and 47-52 respectively in both the leading and trailing elastomeric bearings 35 and 36, respectively, are shaped so that their focal points $F_p$ are coincident with the longitudinal axis of the attachment bushing.

In the links illustrated and described in the aforementioned Schmidt patent, the various elastomeric layers extend continuously about the inner mounting bushings, or sleeves. The shims are split to facilitate manufacture. When the links are in their normal torque transmitting operating mode, i.e. wherein the leading end 25a preceeds the trailing end 25b during rotation of the coupling 10, the elastomeric layers at the furthermost leading and trailing ends of the link are subjected substantially entirely to compressive loads on surfaces 25" and 25''' while the diametrically-opposite elastomeric layers of each elastomeric bearing are tensioned. In conditions of transient reverse torque, which is typically of a lower magnitude than the normal operating torque, the layers adjacent the furthermost leading and trailing ends of the links are subjected to tensile stresses and the diametrically-opposite elastomeric layers undergo compression.

In the design of elastomeric bearing subjected to cyclic loading, it is desirable to avoid the creation of tensile stresses among the various elastomeric layers in order to avoid molecular tearing, or cavitation, due to a state of hydrostatic stress within the layers. Cavitation modes of failure are generally initiated within an elastomeric layer in which damage sites develop and accelerate propagation of fatigue cracking and elastomer degradation. It is desirable therefore, to prohibit the initiation and propagation of elastomer fatigue cracking in order to enhance the overall fatigue life of the elastomeric bearing.

According to the present invention, undesirable tension stresses due to normal transfer of torque are avoided in the elastomeric bearings provided in the coupling links. To this end, each elastomeric bearing, such as the leading end elastomeric bearing 35 is divided into separate arcuate sections which are discontinuous about the periphery of the inner mounting bushing 53a. The trailing end elastomeric bearing 36 is similarly divided. By providing such separations in each of the bearings, tensile type stresses in the elastomeric layers can be avoided, thereby enhancing the fatigue life of the bearing assembly and, of course, the link itself.

Referring now to FIG. 4, it may be seen that the trailing end elastomeric bearing 36 is divided into two sections: 36A and 36B. The section 36A extends through a major arcuate extent greater than 180° with respect to a line perpendicular to the longitudinal axis B—B of the link 25, or greater than pi radians. The remaining portion of the bearing 36B extends through a smaller, or minor, arcuate extent which, in the illustrated embodiment, is defined within an arc subtended by an angle $\beta$ of about 90°, or Pi/2 radians, relative to the central axis of the inner mounting bushing 53b (See FIG. 4). The arcuate bearing sections 36A and 36B are separated from one another by means of discontinuities which, in the present instance, are provided by cavities 36C and 36D in conjunction with splits in the inelastic shims, preferably, the cavities 36C and 36D extend transversely of the link body 25c between the inner mounting bushing 53b and the inner surface of the link 25. Additionally, the cavities 36C and 36D preferably extend completely across the entire width of the link body 25c and are open at opposite ends. Thus, the cavities 36C and 36D in conjunction with splits in the inelastic shims, provide discontinuities between the various elastomeric layers and the inelastic shims on opposite axial sides of the inner mounting bushings.

In order to avoid completely the transfer of loads or stresses between the arcuate sections 36A and 36B under tensile and compressive loading of the link, the present invention also contemplates the provision of a means providing a slip joint between the minor arcuate bearing section 36B and either the inner bushing member 53b or the link body 25c. Preferably, this is accomplished by providing an unbonded connection either between one of the surfaces of one of the inelastic shims adjacent to an elastomeric layer, or between the inner concave surface of the link body 25c and the outermost elastomeric layer adjacent thereto, or between the outer surface of the mounting bushing 53b and the innermost elastomeric layer 46. A bond should exist between the balance of the elastomeric layers and inelastic shims in order to provide a centering restorative force for the minor bearing section 36B. Preferably, the unbonded connection should permit the inner bushing 53b to separate slightly when the link is tensioned under conditions of normal torque loads on the coupling and to move relative to its adjacent elastomeric surface during the various motions of the link as the coupling rotates. By way of example, the best mode presently contemplated for practicing the invention includes providing the unbonded connection between the concave inner surface of the inelastic shim 57a (FIG. 4) and its adjacent elastomeric layer 46a.

The present invention provides a number of advantages. During the application of loads on the link 25 between its leading end 25a and its trailing end 25b during transfer of normal torque, the cavities 36C and 36D and splits in the inelastic shims in conjunction with the unbonded connection prevent the transfer of tensile stresses from the various elastomeric layers in the minor arcuate section 36B of the elastomeric bearing 36 to the various elastomeric layers in the major arcuate section 36A of the bearing 36. At the same time, when so loaded, the inside surface of the shim 57a separates from its adjacent surface of elastomeric layer 46a to prevent the transmission of tensile stresses between the inner bushings 53a and 53b and the central portion of the link body 25c. Due to the separation at this location, abrasion is avoided as the link body 25c undergoes various motions relative to the mounting bushings 53a and 53b as the coupling 10 rotates about misaligned axes. As a result, the various elastomeric layers in the major arcuate sections 36A and 35A are subjected substantially entirely to compressive and shear loading. Since the various elastomeric layers and inelastic shims in the minor arcuate bearing section 36B are bonded together and to the link body 25c (except for the slip joint) restoring forces are provided to maintain the arcuate bearing section 36B ready to accept transient compressive loads such as are applied when reverse torque conditions exist and the inner bushings 53a and 53b are displaced axially away from their respective link ends 25a and 25b. In such event, the various elastomeric layers in the minor arcuate bearing section 36B and 35B are subjected to compressive and shear loading, but the transmission of tensile stresses from the major bearing section 36A is avoided as a result of the discontinuity and splits in the inelastic shims cavities 36C, 36D. As should be understood by those skilled in the art, the various layers in the leading end elastomeric bearing 35 undergo similar motions under similar loading conditions.

The aforedescribed structure provides a number of benefits. Chief among these benefits is the avoidance of undesirable tensile stresses and strains among the various elastomeric layers which might enable undesirable fatigue conditions to develop. As a result, the link of the present invention has enhanced durability and can be operated for relatively long periods between inspection and replacement. In addition, the load carrying capability of the elastomeric bearings is maximized while simultaneously maintaining the link stiffness at or under a desired maximum value. This is accomplished in the present invention by eliminating the "negative" effects of the stresses on the "tension side" of the elastomeric bearing, i.e. the minor portion 36B adjacent the central part 25c of the link body. In addition, the overall stiffness of the link to cocking and torsional motions is reduced, and this is desirable. The torsional and cocking spring rates provides the further advantage of reducing the hysteresis heat generated within the elastomeric layers during operation of the link, and lower steady state operating temperatures enhance the endurance of the link.

Some variations in the aforedescribed construction may provide additional advantages. For instance, the relative sliding connection between the inelastic shim and its adjacent elastomeric layer may be provided by means of a low friction connection, such as a layer of Teflon. In addition, the elastomeric and inelastic shims in the minor arcuate bearing section 36B may be of a construction different from those in its companion major section 36A to maximize the compression moduli while still providing desirable shear moduli which will accommodate the required torsional and cocking motions present when the link is loaded in a compressive direction. In other words, the minor bearing section 36B may be designed to provide a "snubber action".

In the illustrated embodiment, the shims and elastomeric layers in the major arcuate extent of each bearing are bonded both together and to both the inner bushing and the link body. The various layers are thereby retained in operative relation. It is noted, however, that the spherical shapes of the shims and cavities in the link body also provide a captive, or retention, function of the bearing to the link so that, for certain applications where less than all of the advantages of the preferred embodiment may be adequate, there may be no need for the elastic layers to be bonded to either the inner bushing or the link body.

Preferably, the various inelastic layers are provided by metal shims formed to provide the desired parallel, hemispheric curvatures and nesting relationships illustrated. All of the shims are preferably continuous throughout the major arcuate extent of each bearing. Such continuity further aids in reducing fatigue-inducing stresses among the elastomeric layers and in the body of the link itself adjacent its ends. The various elastomeric layers may be of uniform thickness, or they may be of different thicknesses in a radial direction. A preferred elastomer includes type SPE ® X type elastomer manufactured by Lord Corporation of Erie, Pa. For a more complete description of the manner in which the various elastomeric layers and inelastic shims may be configured to interact in an elastomeric bearing, reference is made to U.S. Pat. Nos. 4,804,352 and RE 30,262 both issued to Schmidt and owned by the assignee of the present application.

In view of the foregoing, it should be apparent that the present invention now provides an improved link and elastomeric bearing assembly which is durable and which can be manufactured readily utilizing state-of-the-art manufacturing techniques. Because of its durability, the link and its associated elastomeric bearings can be operated for relatively long periods of time between inspection and replacement. As a result, the link of the present invention is particularly suited for use in severe heavy duty applications involving the transmission of substantial horsepower in link-type rotary couplings connecting misaligned shafts.

While a preferred embodiment of the present invention has been described in detail, various modifications, alterations and changes may be made without departing from the spirit and scope of the present invention as defined in the appended claims.

We claim:

1. In an elastomeric bearing which forms a portion of a link body, said bearing having a top surface and a bottom surface, an inner member having an outer surface, an outer member having an inner surface surrounding said inner member in spaced relation, layers of elastic material disposed between and outer surface of said inner member and said inner surface of said outer member and extending to said top and bottom surfaces, and at least one inelastic shim disposed between said layers, said inner member being pivotal about a pivot axis relative to said outer member and being displaceable under load in a first loading direction transversely of said pivot axis on a transverse axis, the improvement comprising:

said layers of elastic material forming elastomeric means for retaining the inner member in a position within said bearing outer member for enabling said layers to accept compressive loads in a major arcuate zone in said first loading direction, an unbonded interface located directly adjacent to a selected one of said elastic layers and a selected one of said inner member, said outer member and said at least one inelastic shim, said unbonded interface occurring in a minor arcuate zone in a second loading direction opposite said first loading direction, and a pair of discontinuities extending transversely to said link body for separating of said minor arcuate zone from said major arcuate zone and defining two ends of each said arcuate zone, the boundaries of said arcuate zones being defined by said outer surface of said inner member, by said inner surface of said outer member, by said top and said bottom of said bearing and by said ends formed by said discontinuities, whereby loading of the inner member in the first direction separates the unbonded interface of said minor arcuate zone and the discontinuities, in conjunction with the unbonded interface cooperate to relieve undersirable stresses in the elastic layers in the bearing.

2. An elastomeric bearing according to claim 1 wherein said selected one of said elastic layers is adjacent to said inner member.

3. An elastomeric bearing according to claim 1 wherein said selected one of said elastic layers is adjacent to said outer member.

4. An elastomeric bearing according to claim 1 wherein said selected one of said elastic layers is bonded in said arcuate zone to one of said members and said unbonded connection extends along said inelastic shim.

5. An elastomeric bearing according to claim 1 wherein said at least one inelastic shim has a predetermined arcuate extent around said inner member, and said pair of discontinuities are provided by a pair of cavities extending transversely between said inner and outer members at opposite ends of said inelastic shim.

6. An elastomeric bearing according to claim 1 wherein said unbonded connection extends through said arcuate extent adjacent to said inner member, and the discontinuities are defined by cavities spaced apart equidistantly on opposite sides of said second loading direction.

7. An elastomeric bearing according to claim 1 wherein said pair of discontinuities are provided by a pair of cavities extending between said members along said pivot axis.

8. An elastomeric bearing according to claim 1 wherein said inelastic shim extends around said first member through an arcuate extent greater than pi radians in said first loading direction.

9. An elastomeric bearing according to claim 1 wherein said elastic layers are bonded to said first and second members along their extents in said first loading direction to provide said retaining means.

10. A link for providing a tension and compression connection on a longitudinal axis extending between spaced elements while accommodating relative pivotal motion between the elements in a direction transverse to said axis, said link comprising a link body extending on said axis between said elements, first means for connecting said link body at a first location to one of said elements, and second means for connecting said link body at a second location to the other of said elements, at least one of said means for connecting including an inner member and a plurality of alternating layers of elastic and relatively inelastic material disposed between said inner member and said link body, said alternating layers being arranged in separate arcuate zones which zones extend transverse to said longitudinal axis on diametrically opposite sides of said inner member, and means providing a pair of discontinuities between said alternating layers on opposite sides of said longitudinal axis to permit said inner member to pivot with minimal restraint relative to said link body when said link body is stressed in tension, whereby the link can accommodate the tension and compression loads and pivotal motions in a manner that minimizes internal stresses among the elastic layers.

11. A link according to claim 10 including means providing a slip joint extending through a predetermined arcuate extent between said discontinuities and between one of said layers of elastic material and an adjacent layer.

12. A link according to claim 11 wherein said one layer of elastic material is located adjacent to said inner member and is bonded thereto, and said adjacent layer is inelastic and includes a shim.

13. A link according to claim 12 wherein said shim has a first surface confronting said one layer of elastic material and a second surface opposite said first surface bonded to said link body by means of intervening bonded layers of said elastic and inelastic material bonded together between said discontinuities.

14. A link according to claim 13 wherein said pair of discontinuities are defined by a pair of cavities extending along the pivot axis of said inner member between said inner member and said link body.

15. A link according to claim 14 wherein said pair of cavities are located on opposite sides of said longitudinal axis equidistant therefrom within an arc subtended by an included angle of less than about 180° from the pivot axis of said inner member.

16. A link according to claim 10 wherein said alternating layers are bonded between said inner member and said outer member in an arcuate zone located diametrically opposite the arcuate zone between the discontinuities.

17. A link according to claim 10 wherein said relatively inelastic layers in one of said zones extend through an arcuate extent greater than pi radians for normally accepting compressive loads.

18. In a link-type coupling for transferring torque between a drive member having a first rotational axis and a driven member having a second rotational axis, wherein said first and second axis may be misaligned, including a first plurality of connectable means for transmitting torque from said drive member to a linkage means, attached to said drive member and said linkage means, a second plurality of connectable means for transmitting torque from said linkage means to said driven member, attached to said driven member and said linkage means, each plurality being located radially outward of their respective rotational axis in spaced confronting relation with one another, said linkage means disposed between said drive and driven members interconnecting said first and second plurality of connectable means of said drive and said driven members respectively, said linkage means including a link body having a longitudinal axis extending between at least certain ones of said plurality of connectable means substantially tangentially to said rotational axis, and elastomeric bearing means connecting said link body to said connectable means for pivotal relative motion about spaced axis transverse to said longitudinal axis, said link being subjected to tension and compression loading under various conditions of rotational motion, the improvement wherein said elastomeric bearing means includes alternating layers of elastomeric material and inelastic shims bonded together throughout separate arcuate zones which zones have their ends defined by discontinuities, said zones being spaced apart on said longitudinal axis on diametrically opposite sides of said connectable means, whereby internal stresses can be reduced among the elastomeric layers while accommodating link motions.

19. Apparatus according to claim 18 wherein said arcuate zones are separated by a pair of cavities extending between said connectable means and said link body.

20. Apparatus according to claim 18 wherein at least one of said arcuate zones includes a shim having a surface movable in closely spaced relation relative to its adjacent elastomeric layer when said link is subjected to tension loads of a predetermined magnitude.

21. Apparatus according to claim 20 wherein said shim is located adjacent to at least certain ones of said plurality of connectable means.

22. Apparatus according to claim 20 wherein said shim is located adjacent to said link body.

23. Apparatus according to claim 18 wherein said arcuate zones are divided into major and minor portions with said major portion normally being subjected to compressive stresses when said link is tensioned.

24. Apparatus according to claim 23 wherein said inelastic shim is located adjacent to at least certain ones of said plurality of connectable means and has a convex surface normally engageable with its adjacent elastic layer but being disengageable from its adjacent elastic layer for movement relative thereto in closely spaced relation where the link is subjected to tension loads of a predetermined magnitude.

25. Apparatus according to claim 24 wherein said major portions of said arcuate zones is greater than about pi radians, and said inelastic layers are continuous throughout substantially said entire major portion.

* * * * *

UNITED STATES PATENT OFFICE
CERTIFICATE OF CORRECTION

PATENT NO. : 5,186,686

DATED : Feb. 16, 1993

INVENTOR(S) : Staples, et al., Erie, PA

Page 1 of 2

It is certified that error appears in the above-identified patent and that said Letters Patent are hereby corrected as shown below:

One page of specification text has been omitted. Col. 1, line 25, after "non-", insert: --lubricated manner to provide a certain service life, there is a need for links which are capable of operating for longer periods of time between inspection and replacement periods.

With the foregoing in mind, a primary object of the present invention is to provide an improved link for use in a link-type coupling.

Another object of the present invention is to provide a novel elastomeric bearing for a link of the type used in a link-type coupling to transmit torque between drive and driven members which may be rotatable about misaligned axes.

A further object of the present invention is to provide, for use in heavy duty link-type coupling, a unique link which is capable of operating for a relatively long time between inspection and replacement periods.

A still further object of the present invention is to provide a durable link which can be manufactured readily utilizing state-of-the-art manufacturing techniques and materials.

More specifically, the present invention provides a link particularly suited for use in link-type rotary--

Col 1, line 58, change "suction" to --section--.

UNITED STATES PATENT OFFICE
CERTIFICATE OF CORRECTION

PATENT NO. : 5,186,686
DATED : Feb. 16, 1993
INVENTOR(S) : Staples, et al., Erie, PA It is certified that error appears in the above-identified patent and that said Letters Patent are hereby corrected as shown below:

Col 2, line 31, change "underopenings" to --underpinnings--.

Col 2, line 38, change "of and" to --find--.

Col 2, line 51, change "he" to --the--.

Col 3, line 20, change "10" to --15--.

Col 3, line 39, change "coaxially" to --coaxially,--.

Col 3, line 66, change "and" to --end--.

Col 7, line 57, change "and" to --said--.

Col 10, line 3, change "axis" to --axes--.

Col 10, line 14, change "axis" to --axes--. (1st occurrence)

Signed and Sealed this

Seventh Day of March, 1995

BRUCE LEHMAN

Attest:

Attesting Officer

Commissioner of Patents and Trademarks